United States Patent
Jankowski et al.

(10) Patent No.: US 11,599,860 B2
(45) Date of Patent: Mar. 7, 2023

(54) LIMIT PURCHASE PRICE BY STOCK KEEPING UNIT (SKU)

(71) Applicant: INTERNATIONAL BUSINESS MACHINES CORPORATION, Armonk, NY (US)

(72) Inventors: Julia Jankowski, Raleigh, NC (US); Kaleigh E. Williams, Raleigh, NC (US); Taylor Presley, Raleigh, NC (US); Elizabeth C. Huntley, Raleigh, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 112 days.

(21) Appl. No.: 16/178,986

(22) Filed: Nov. 2, 2018

(65) Prior Publication Data
US 2020/0143342 A1    May 7, 2020

(51) Int. Cl.
*G06Q 10/08*     (2023.01)
*G06Q 20/10*     (2012.01)
*G06Q 10/107*    (2023.01)
*G06Q 10/087*    (2023.01)

(52) U.S. Cl.
CPC .......... *G06Q 20/10* (2013.01); *G06Q 10/087* (2013.01); *G06Q 10/107* (2013.01)

(58) Field of Classification Search
CPC ..... G06Q 20/10; G06Q 10/087; G06Q 10/107
See application file for complete search history.

(56) References Cited

U.S. PATENT DOCUMENTS

| | | | |
|---|---|---|---|
| 5,794,207 A * | 8/1998 | Walker | G06Q 10/02 705/77 |
| 6,405,175 B1 | 6/2002 | Ng | |
| 7,124,098 B2 | 10/2006 | Hopson et al. | |
| 7,958,017 B1 * | 6/2011 | Rempe | G06Q 30/0633 705/26.1 |
| 8,234,178 B1 | 7/2012 | Rempe et al. | |
| 2003/0033211 A1 * | 2/2003 | Haines | G06Q 30/0207 705/14.1 |
| 2009/0055285 A1 * | 2/2009 | Law | G06Q 30/0631 705/26.35 |
| 2009/0254447 A1 | 10/2009 | Blades | |

(Continued)

FOREIGN PATENT DOCUMENTS

KR    20200010101    * 12/2020    ......... G06Q 30/0211

OTHER PUBLICATIONS

The NIST Definition of Cloud Computing, Nt'l Inst. of Standards and Technology, Dept. of Commerce, Sep. 2011.*

(Continued)

*Primary Examiner* — Mike Anderson
*Assistant Examiner* — Matthew Cobb
(74) *Attorney, Agent, or Firm* — Elliot J. Shine

(57) ABSTRACT

A method, computer system, and a computer program product for managing an electronic payment function by an electronic device is provided. The present invention may include initiating an electronic payment function by an electronic device based on determining that conditions of a user specification are met, whereby the initiated electronic payment function triggers an electronic purchase of a target item.

20 Claims, 5 Drawing Sheets

(56) References Cited

U.S. PATENT DOCUMENTS

| | | | | |
|---|---|---|---|---|
| 2010/0106652 A1* | 4/2010 | Sandholm | ............. | G06Q 10/04 |
| | | | | 705/80 |
| 2011/0161182 A1* | 6/2011 | Racco | ................ | G06Q 30/0277 |
| | | | | 705/26.1 |
| 2011/0288918 A1* | 11/2011 | Cervenka | ............... | G06Q 20/40 |
| | | | | 705/14.17 |
| 2014/0279420 A1* | 9/2014 | Okerlund | ............... | G06Q 40/00 |
| | | | | 705/39 |
| 2015/0081559 A1* | 3/2015 | Dua | ....................... | G06Q 20/40 |
| | | | | 705/44 |
| 2017/0116655 A1* | 4/2017 | Batlle | ................ | G06Q 30/0637 |
| 2017/0206589 A1* | 7/2017 | Deshpande | ............ | G06N 20/00 |
| 2017/0213186 A1* | 7/2017 | Grifoni | ................ | G06Q 10/087 |
| 2017/0230754 A1* | 8/2017 | Dusan | ................. | H04R 1/1016 |
| 2018/0005227 A1* | 1/2018 | Sandelov | ............. | G06Q 20/341 |
| 2018/0150869 A1* | 5/2018 | Finnegan | ........... | G06Q 30/0239 |
| 2019/0034917 A1* | 1/2019 | Nolan | .................. | G06Q 20/065 |

OTHER PUBLICATIONS

Mell et al., "The NIST Definition of Cloud Computing", Recommendations of the National Institute of Standards and Technology, NIST Special Publication 800-145, Sep. 2011, 7 pages.

\* cited by examiner

US 11,599,860 B2

LIMIT PURCHASE PRICE BY STOCK KEEPING UNIT (SKU)

BACKGROUND

The present invention relates generally to the field of computing, and more particularly to e-commerce.

Often times, an individual may be interested in purchasing a service or product but may be limited with respect to available funds. Limited funds may represent a sum that the individual may be willing to spend, or may afford to spend, or both. However, an individual may not have the time nor patience to scan e-commerce sites and wait until the desired service or product reaches an acceptable price point.

SUMMARY

Embodiments of the present invention disclose a method, computer system, and a computer program product for limiting a purchase price. A method, computer system, and a computer program product for managing an electronic payment function by an electronic device is provided. The present invention may include initiating an electronic payment function by an electronic device based on determining that conditions of a user specification are met, whereby the initiated electronic payment function triggers an electronic purchase of a target item.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
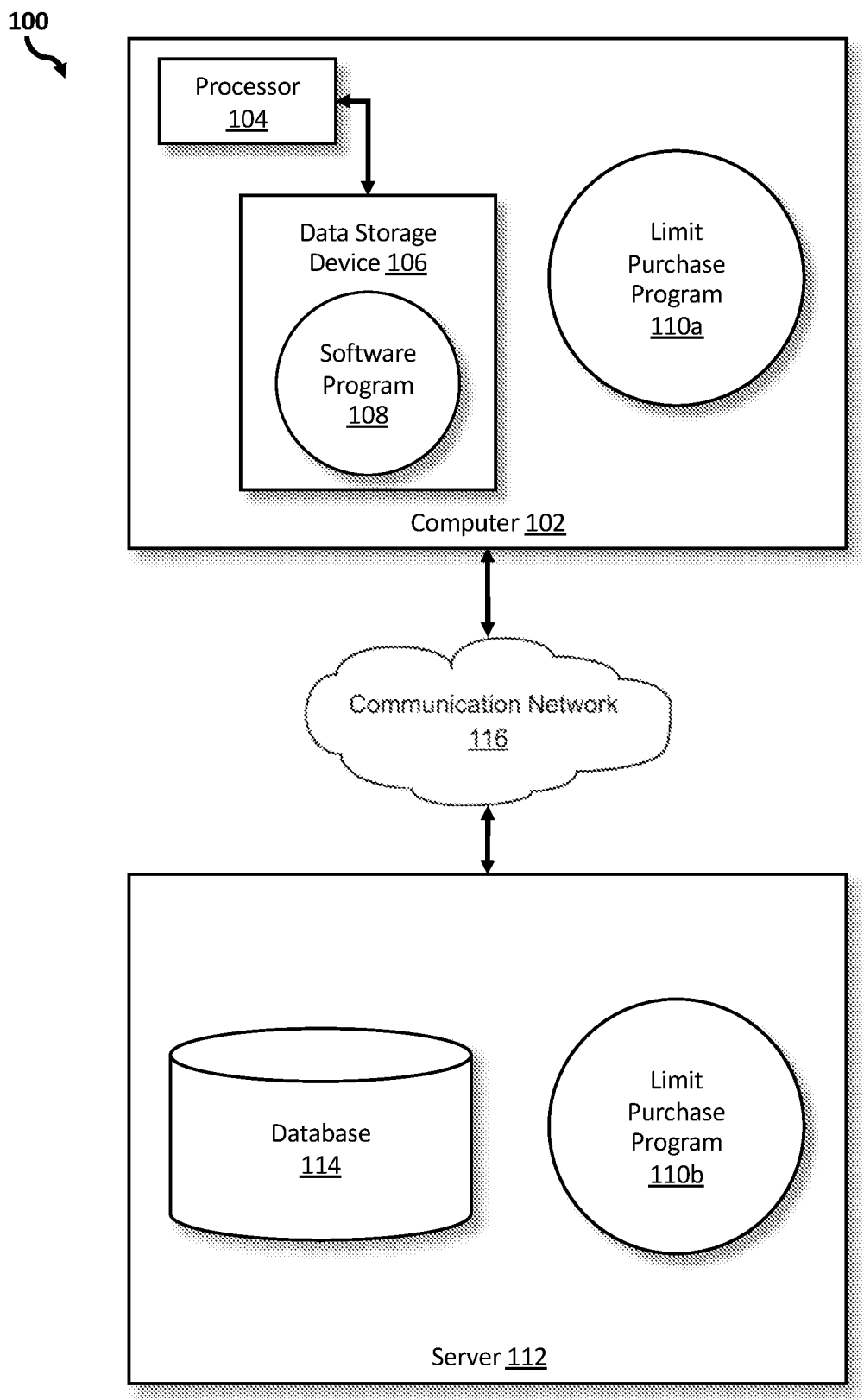
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for limiting purchase price by SKU. As such, the present embodiment has the capacity to improve the technical field of e-commerce by executing a purchase automatically based on a user's preset qualifications. More specifically, the present invention may include initiating an electronic payment function by an electronic device based on determining that conditions of a user specification are met, whereby the initiated electronic payment function triggers an electronic purchase of a target item.

Often times, an individual may be interested in purchasing a service or product but may be limited with respect to available funds. Limited funds may represent a sum that the individual may be willing to spend, or may afford to spend, or both. However, an individual may not have the time nor patience to scan e-commerce sites and wait until the desired service or product reaches an acceptable price point.

Therefore, it may be advantageous to, among other things, provide a means for purchasing services and/or products, based on an inputted stock keeping unit (SKU), which may execute a purchase automatically based on a user's inputted qualifications.

According to at least one embodiment, inputted qualifications of the user may include, but are not limited to including, a desired service and/or product, a size, if applicable, a color, a connected bank account and/or a sum of money, and a target price. Based on the inputted qualifications of the user, the limit purchase program may scan online marketplaces for the desired service and/or product. Once a target price is found in a trusted online marketplace, the desired service and/or product may be automatically purchased from the funds allocated by the user.

According to at least one embodiment, the limit purchase program may send a notification to the user if the price of a desired service and/or product increases or decreases by a specific percentage, based on an inputted qualification.

According to at least one embodiment, the limit purchase program may send a notification to an online marketplace (e.g., a retailer) if the target price of a user (e.g., the price that the user may be willing to spend) comes within a predetermined percentage of the offer price of the item on the online marketplace.

According to at least one embodiment, the limit purchase program may be integrated with online retail platforms so as to enable users to create a watch list and to view the price of watched items from many different retailers at once. A user may select (e.g., input manually or capture a photograph of) a product SKU in order to add it to the user's watch list.

According to at least one embodiment, a user of the limit purchase program may save the SKU of an item which the user desires to purchase, and the limit purchase program may thereafter sell and/or license saved SKU information to retailers who may determine if there is enough demand to impact the retailer's inventory and/or whether any pricing changes should be made.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a limit purchase program 110a. The networked computer environment 100 may also include a server 112 that is enabled to run a limit purchase program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 3, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the limit purchase program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the limit purchase program 110a, 110b (respectively) to execute a purchase automatically based on a user's preset qualifications. The limit purchase method is explained in more detail below with respect to FIG. 2.

Figure 2:
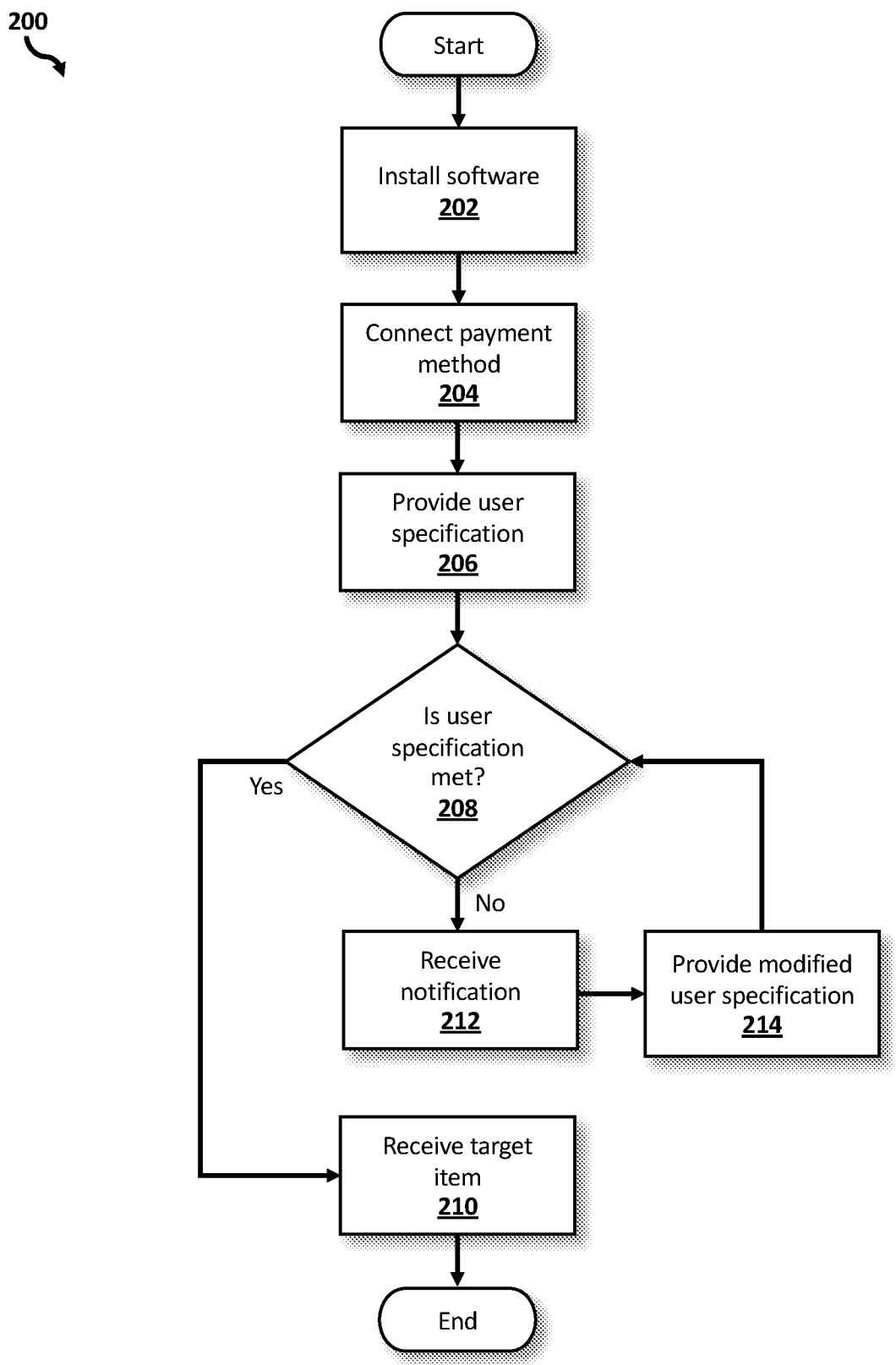
FIG. 2 is an operational flowchart illustrating a process for limiting a purchase price according to at least one embodiment.

Referring now to FIG. 2, an operational flowchart illustrating the exemplary limit purchase process 200 used by the limit purchase program 110a and 110b according to at least one embodiment is depicted.

At 202, the limit purchase program 110a, 110b is installed. The limit purchase program 110a, 110b may be either installed on an e-commerce site or may be built as a standalone platform (e.g., a self-contained computer program which may be launched from a user's desktop). The limit purchase program 110a, 110b may be cognitive and automatic whereby once the user inputs a SKU number or a given set of specifications, the limit purchase program 110a, 110b may run in the background, searching all connected marketplaces, including all vendors and websites, for the lowest price of a desired item.

A connected marketplace may include any marketplace which may be accessed by the limit purchase program 110a, 110b over the internet, or which may register to participate in the limit purchase program 110a, 110b. A connected marketplace which may not be accessed over the internet, but which may register to participate with the limit purchase program 110a, 110b, may upload a list of current inventory to the limit purchase program 110a, 110b, and may update the list of current inventory daily, weekly, monthly, or as necessary, among many other update frequencies. This may enable a user of the limit purchase program 110a, 110b to purchase goods from a registered connected marketplace, as well as from other connected marketplaces which may be accessed over the internet.

A trusted marketplace may be further defined as a connected marketplace which the user specifically indicates an affinity for and a preference to purchase from. The limit purchase program 110a, 110b may be instructed by the user, based on specifications inputted into the limit purchase program 110a, 110b, as will be described in more detail below with respect to step 206, that the purchase of a desired item should be first attempted from a trusted marketplace, and should thereafter be attempted from any other connected marketplace which sells the user's desired item, and which offers the best price for the user's desired item.

The limit purchase program 110a, 110b may be implemented as a browser plug-in. A browser plug-in may interact with a connected browser and any media to which the browser plug-in may be connected, including but not limited to a payment mechanism (i.e., a payment method), described in more detail below with respect to step 204. A browser plug-in may be developed in Hypertext Markup Language (HTML), or JavaScript, among other programming languages, and may also be developed using machine code and application programming interfaces (APIs) provided by a web browser.

The limit purchase program 110a, 110b may run in the background of a user's computer at all times after the limit purchase program 110a, 110b is installed on the user's browser or on the user's desktop.

For example, a user Julia installs the limit purchase program 110a, 110b on her browser, as a browser plug-in. Julia knows that she wants to purchase a pair of shoes, but she also knows that she does not have the necessary amount of funds to purchase the shoes at the current market price. Julia hopes that by specifying within the limit purchase program 110a, 110b the exact shoes that Julia is hoping to purchase, the limit purchase program 110a, 110b will use the means described below to find the shoes for a price that Julia can afford.

At 204, a payment method is connected. A user may connect and store a payment method within the limit purchase program 110a, 110b interface so that a purchase may not be delayed by a request to the user for such information. A payment method may include a credit card, a bank account and/or an online piggybank which may contain funds sufficient to purchase an item desired by the user.

A user may also connect a store rewards card and may indicate within the limit purchase program 110a, 110b the connected marketplace which accepts the store rewards card.

Enabling a user to connect a payment method may require the limit purchase program 110a, 110b to utilize an online payment gateway account, which may connect a payment method provided by the user, may verify that the connected payment method is accurate, and may transfer any requests made by the user. An online payment gateway account may interact with a user's bank account and/or credit card in real time, at the moment the limit purchase program 110a, 110b attempts to make a purchase for the user.

Continuing with the above example, Julia connects her new debit card and indicates within the limit purchase program 110a, 110b that the new debit card is intended to be the primary form of payment over any other payment method which may exist in Julia's profile for the limit purchase program 110a, 110b.

At 206, a user specification is provided. A user specification may include a stock keeping unit (SKU), a color of an item, a threshold price of an item (i.e., a maximum), a size of an item, a quantity of an item, a relevant discount which may be applied, when the item may be needed by, any return requests of the user (e.g., that the item be returnable within a certain number of days), and any other identifying features which may be required to be satisfied before the limit purchase program 110a, 110b may place an order.

A SKU may be a set of information and/or features associated with a good or service that collectively define the good and/or service and distinguish the good and/or service from other goods and/or services. Item specifications included within the SKU may be used by the limit purchase program 110a, 110b to determine an item which may be suitable to the user. An item may be determined to be similar to another item based on the fact that certain elements of an item SKU may be met. If an item is determined to be similar to an item requested by the user, whether or not the similar item is an exact match to the item requested by the user, then the limit purchase program 110a, 110b may provide the similar item to the user as an alternative purchase option. For example, if the user is interested in a white sneaker of a particular brand, then the limit purchase program 110a, 110b may search for the specific inputted item and may also search for other white sneakers with similar attributes, based on the information and/or features included within the item SKU, which the limit purchase program 110a, 110b estimates may be amenable to the user. Similar items presented to the user may have a lower price and/or better customer reviews, among other attributes.

A user may provide an item SKU by scanning the SKU using a mobile device or tablet which may be connected to the limit purchase program 110a, 110b. The SKU may be captured from a mobile device or tablet using input/output capabilities, including but not limited to Bluetooth® (Bluetooth and all Bluetooth-based trademarks and logos are trademarks or registered trademarks of Bluetooth SIG, Inc. and/or its affiliates). The limit purchase program 110a, 110b may be able to recognize the item SKU by browsing connected marketplaces and other connected sites (e.g., search engines). An item SKU may be a unique identifier which may correlate to a single item. An item SKU may consist of letters and numbers which may be used to identify characteristics of an item.

The limit purchase program 110a, 110b may prioritize certain features of an item SKU (i.e., SKU features) over other SKU features, based on desires of the user, and may continually update a prioritization schedule based on user feedback. If, for example, the limit purchase program 110a, 110b prioritizes price over other SKU attributes, and provides the user with other purchase options based on a price feature included in the item SKU (e.g., a 'price' SKU attribute), but the user continuously rejects the newly proposed items, then the limit purchase program 110a, 110b may learn from the user's actions and may amend the prioritization schedule to reflect the new desires of the user (e.g., price may no longer be a priority of the user).

The inclusion of a SKU may limit or narrow the field in which the desired item may be found and may thus reduce the amount of search time required by the limit purchase program 110a, 110b to find an item, and may similarly limit the amount memory needed to be used to conduct a search. This may be done by the limit purchase program 110a, 110b by first extracting a category of item from the SKU, if one is included. Next, the limit purchase program 110a, 110b may search certain connected databases, based on the extracted category of item, while eliminating other databases from those required to be searched (e.g., if the desired item is a pair of white sneakers, then the limit purchase program may not search databases for home furnishings). This may improve the efficiency of the computing system by limiting the amount of memory required to complete the search and may reduce the time it takes to complete a search.

The limit purchase program 110a, 110b may use the connected browser plug-in, as described previously with respect to step 202 above, to set specifications which may indicate the exact item(s) the user desires, and the price the user may afford to pay (i.e., a target price). A user may have the option to specify the exact item, brand, model number, color, size, and date by which the item may be needed (i.e., a date limit), among many other user specifications. As was described previously with respect to step 202 above, the limit purchase program 110a, 110b may run in the background of a user's computer and may search for an optimal purchase price on connected e-commerce websites, as well as other connected marketplaces, based on the user's inputted specifications.

Based on the inputted specifications of the user, the limit purchase program 110a, 110b may track, analyze and determine when the price of an item is at or below a target price (e.g., a maximum price the user can pay for the item). The limit purchase program 110a, 110b may recognize date limits and any user inputted specifications and may automatically purchase an item based on a user's pre-approval within the limit purchase program 110a, 110b, as will be described in more detail with respect to step 210 below. A user's pre-approval to automatically purchase an item may be a user specification provided within the user's profile for the limit purchase program 110a, 110b, and may not be required to be given by each user of the limit purchase program 110a, 110b.

A user may also specify, within the user's profile for the limit purchase program 110a, 110b, a preference for notification upon successful purchase of a desired item. A notification provided to the user may be in verbal or written form, depending on an inputted user specification. A notification may further be an email communication, or an alert on the user's mobile device, tablet, or any other connected computing device, based on the user's inputted specification. A notification may include a purchase price of an item, along with a copy of a purchase order (e.g., a receipt) and any shipment details (e.g., a tracking number), among other user specified information.

Alternatively, or additionally, a user may enter, as an additional user specification, an online product number and a corresponding e-commerce site, and/or a photograph of an item. Based on this visual representation of the item, the limit purchase program 110a, 110b may search connected marketplaces and other connected websites to find all instances of the specified item and may add these instances of the item to a watch list within the user's account of the limit purchase program 110a, 110b.

Functions of the limit purchase program 110a, 110b, including those recited above (e.g., notification of the user, preference for a specific store, etc.), may be tailored to the user's needs based on the aforementioned user specifications.

Continuing with the above example, Julia adds her favorite running shoes in a size 7.5 to her wish list on the limit purchase program 110a, 110b and indicates her preferred running website. Julia then sets a threshold purchase price of $107.97.

At 208, it is determined that the received user specification is met. If the price of a specified SKU changes to match or beat a specified threshold price, then the limit purchase program 110a, 110b may complete the purchase of the item without any further request from the user, based on a preconfigured specification within the limit purchase program 110a, 110b.

For example, a user may indicate within the user's profile of the limit purchase program 110a, 110b that final user approval for a purchase is not required if the terms of the purchase meet the user's predefined specifications. Alternatively, a user may indicate within the user's profile of the limit purchase program 110a, 110b that final user approval for a purchase is always required before a purchase may be made, whether or not all of the user's predefined specifications may be met. A user may optionally require approval for the purchase of certain types of goods, or for the purchase of goods which are above a certain monetary threshold, among other approval instances which may be at the discretion of the user, and which may be indicated by the user within the user's profile for the limit purchase program 110a, 110b.

A request for final user approval may be sent to the user in an email, in a text message, or in a notification on the user's browser, among other notification transmission methods, depending on the specifications of the user which may be predefined within the user's profile for the limit purchase program 110a, 110b. A request for final approval may include a click-through link, which may permit the user to indicate that the user approves or does not approve the prospective purchase.

Alternatively, or additionally, if the target price of an item is determined to be within a certain percentage of a merchant's listed price for the item, based on a percentage indicated by the user along with other user specifications, as described previously with respect to step 206 above, or based on a percentage indicated by a merchant within the limit purchase program 110a, 110b, then the limit purchase program 110a, 110b may send an automatic message to the merchant (e.g., via email, text message, online chat on the merchant's website, etc.) to inquire as to whether the merchant may desire to sell the item at the target price indicated by the user (e.g., whether the merchant may agree upon the user's desired price). The limit purchase program 110a, 110b may also be instructed to send a message to a merchant based on a price difference that is indicated by the merchant within the limit purchase program 110a, 110b. In these instances, the merchant may permit communication between the limit purchase program 110a, 110b located on the user's mobile device or tablet, among other devices, and the merchant's server (e.g., server computer 112).

For example, this may include the merchant indicating to the limit purchase program 110a, 110b that if a buyer desires to purchase an item for 10% less than the merchant's list price, then the limit purchase program 110a, 110b should inform the merchant of the prospective buyer so that the sale may be facilitated at an agreed-upon price. Likewise, a merchant may indicate within the limit purchase program 110a, 110b that the pricing of the merchant may be even more negotiable, and that the merchant may be willing to consider offers of the user which are within a greater percentage (e.g., 15% or 20%) of the merchant's listed price.

This automatic bargaining mechanism may benefit both the merchant and the user, who may respectively make a sale and purchase desired goods for a compromised price agreed upon by both parties.

Continuing with the above example, one month after Julia adds the shoes to her watch list on the limit purchase program 110a, 110b, holiday sales begin, and Julia's threshold price is reached. Since Julia specified within the limit purchase program 110a, 110b that the limit purchase program 110a, 110b can automatically purchase an item once a threshold price is reached, Julia is not consulted again before the limit purchase program 110a, 110b completes Julia's purchase. Julia receives an email notification of the successful transaction in her email and one week later Julia's shoes are at her door.

At 210, the target item is received. As indicated above, the limit purchase program 110a, 110b may have authority to purchase a desired item without additional user input if the price of a SKU (e.g., a desired item) falls within or below a user's specified threshold (e.g., meets a target price). Alternatively, a user may indicate within the user's profile for the limit purchase program 110a, 110b that the user must be notified each time a potential sale may occur. The latter option may delay the purchase of an item by the limit purchase program 110a, 110b but may ensure that the user does not wish to make any additional changes before the purchase is complete.

If, at 208, it was determined that the user specification was not met, then at 212, a notification is received by the user advising that the price of the desired item is not within the specified threshold and based on market trends and historical data, the desired item is not expected to be within the specified threshold again. Based on the received notification at 212, a user provides a modified user specification at 214.

In this case, the user may desire to either remove the specified item from the user's watch list, or to adjust the price of the item on the user's watch list so that the item may have a more realistic chance of being purchased by the limit purchase program 110a, 110b. In this case, a user may desire to modify the inputted specifications so that the limit purchase program 110a, 110b may have a chance of purchasing the watched item (e.g., the desired item). This may include contributing additional funds to mirror the list price of the desired item. This may alternatively include waiting for the purchase price to drop with a coupon, an end of season sale, or something else.

For example, a user may receive a notification that the price of an item may change, given market trends and holiday influxes. In this case, the limit purchase program 110a, 110b may use a historical database (e.g., database 114) to determine that the price of an item is likely to remain above the user's specified threshold for the next three months. Likewise, the limit purchase program 110a, 110b may be used to predict downward market trends and may advise the user that if the user waits several months to purchase a watched item, the price is likely to decrease by a specified percentage.

In order to predict such trends and to accurately advise users, the limit purchase program 110a, 110b may consult a database (e.g., database 114) of information pertaining to yearly shopping deals, store sales, and promotions, among other things. The limit purchase program 110a, 110b may also search the internet for all websites which may contain information pertaining to sales, promotions, and/or other shopping deals. Any information gathered by the limit purchase program 110a, 110b from an internet search may be added to the database of sale and promotion information maintained by the limit purchase program 110a, 110b.

It may be appreciated that FIG. 2 provides only an illustration of one embodiment and do not imply any limitations with regard to how different embodiments may be implemented. Many modifications to the depicted embodiment(s) may be made based on design and implementation requirements.

Figure 3:
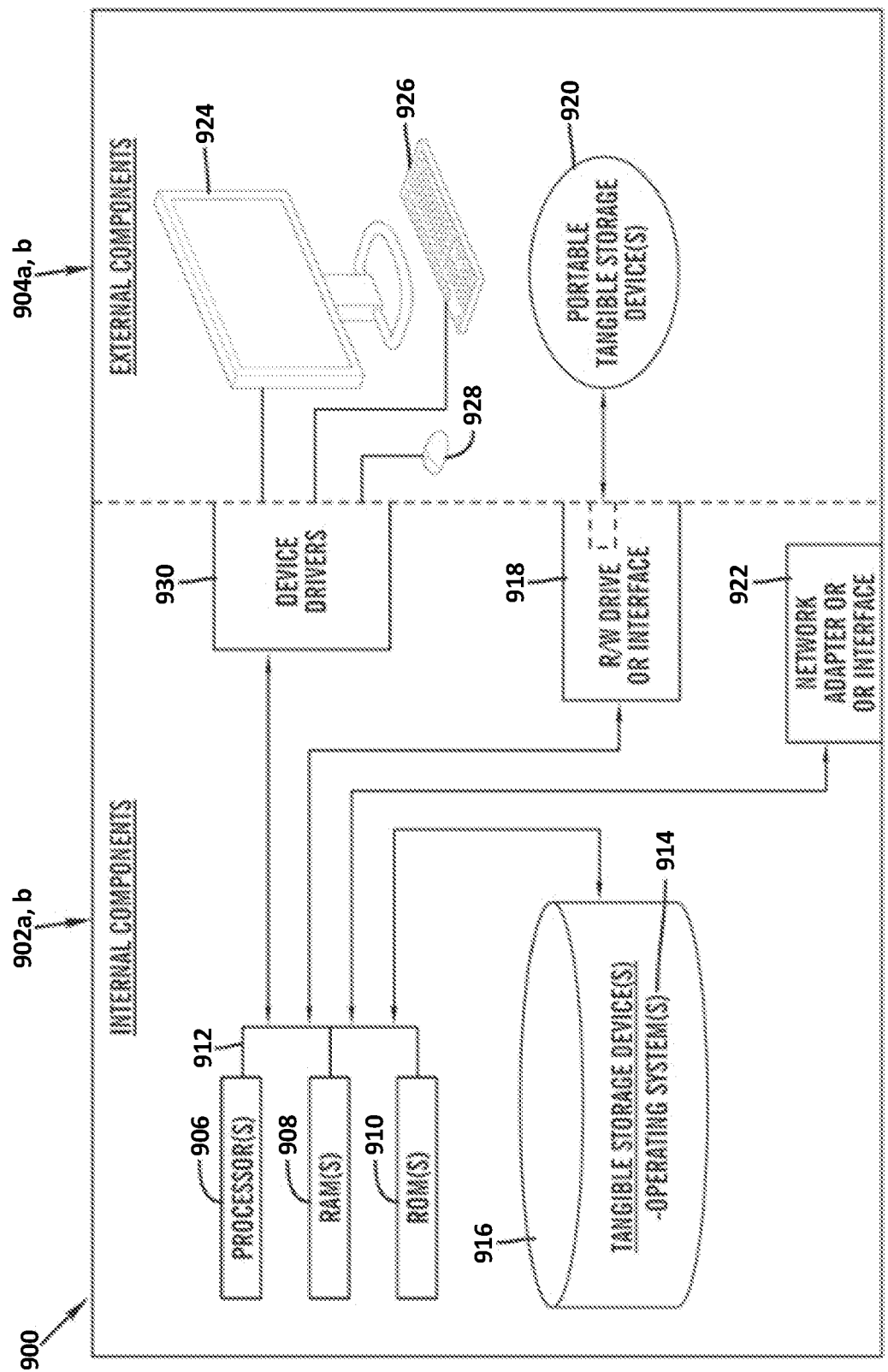
FIG. 3 is a block diagram of internal and external components of computers and servers depicted in FIG. 1 according to at least one embodiment.

FIG. 3 is a block diagram 900 of internal and external components of computers depicted in FIG. 1 in accordance with an illustrative embodiment of the present invention. It should be appreciated that FIG. 3 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 3. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the limit purchase program 110a in client computer 102, and the limit purchase program 110b in network server 112, may be stored on one or more computer-readable tangible storage devices 916 for execution by one or more processors 906 via one or more RAMs 908 (which typically include cache memory). In the embodiment illustrated in FIG. 3, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the limit purchase program 110a and 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the limit purchase program 110a in client computer 102 and the limit purchase program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the limit purchase program 110a in client computer 102 and the limit purchase program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
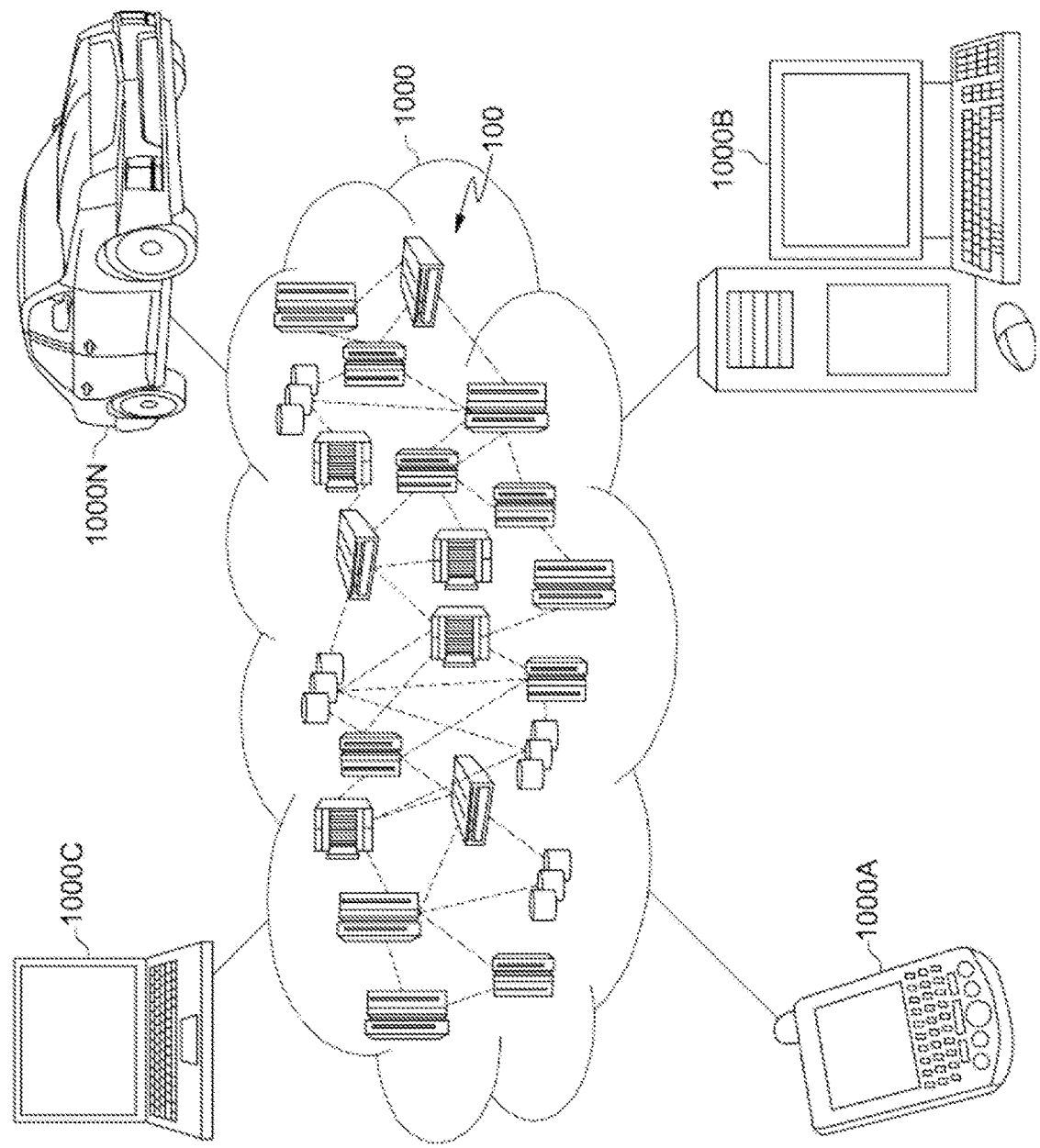
FIG. 4 is a block diagram of an illustrative cloud computing environment including the computer system depicted in FIG. 1, in accordance with an embodiment of the present disclosure.

Referring now to FIG. 4, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 4 are intended to be illustrative only and that computing nodes 100 and cloud computing environment 1000 can communicate with any type of computerized device over any type of network and/or network addressable connection (e.g., using a web browser).

Figure 5:
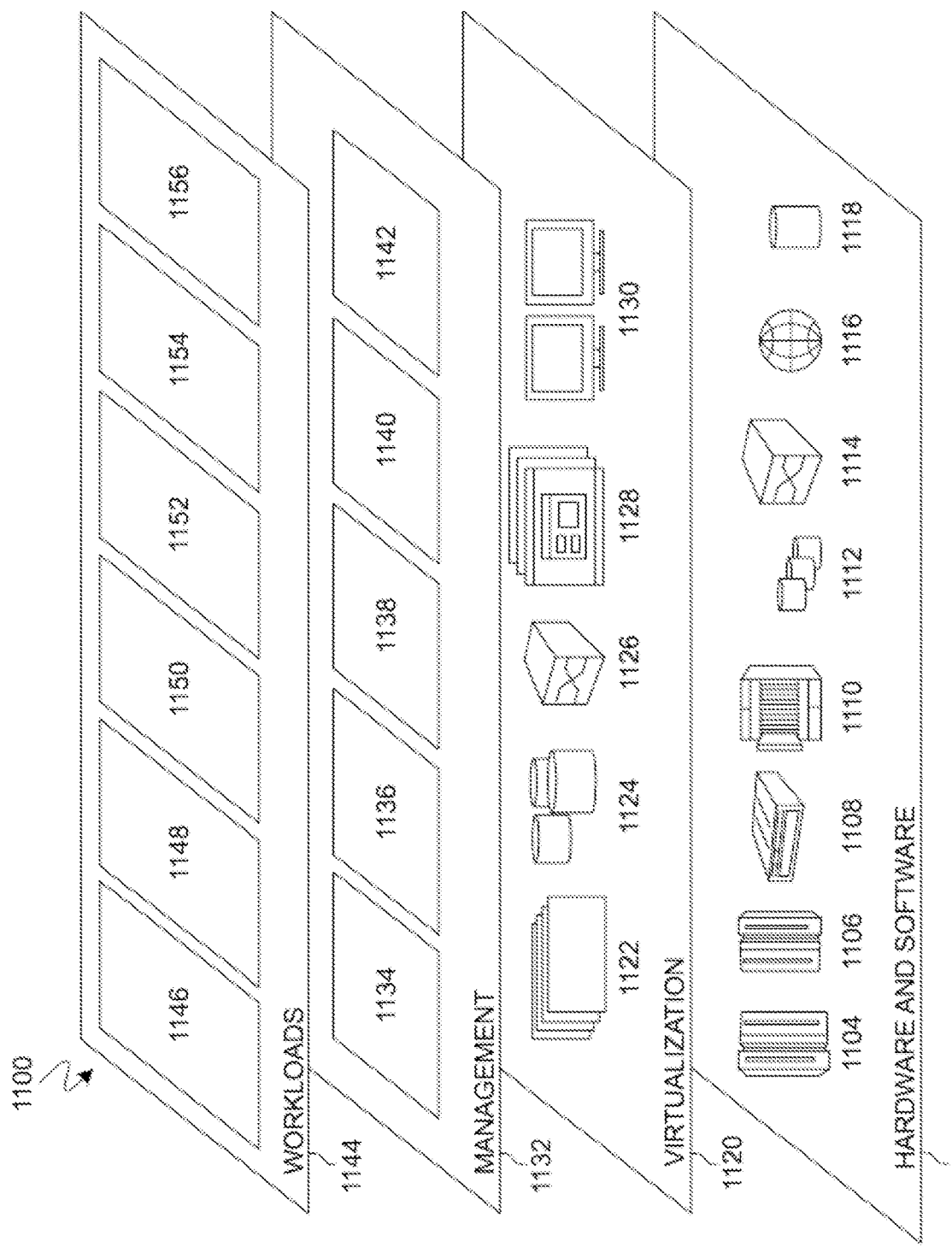
FIG. 5 is a block diagram of functional layers of the illustrative cloud computing environment of FIG. 4, in accordance with an embodiment of the present disclosure.

Referring now to FIG. 5, a set of functional abstraction layers 1100 provided by cloud computing environment 1000 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and limit purchase 1156. A limit purchase program 110a, 110b provides a way to execute a purchase automatically based on a user's preset qualifications, solving the problem that exists when a user is interested in purchasing a service and/or product but is limited on the price the user is willing to, or can afford to, spend.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for managing an electronic payment function by an electronic device, the method comprising:
   determining, using one or more connected databases comprising one or more items for purchase, that conditions of a user specification are met, wherein the conditions of the user specification are determined based on capturing a photograph of a stock keeping unit (SKU) data structure at a user direction, using a camera input capability of a mobile device or tablet by scanning the SKU data structure using a wireless communication capability of the mobile device or tablet, wherein the SKU data structure has associated conditions of the user specification, and performing visual analysis of the one or more items for purchase;
   facilitating an agreement between a user and a merchant;
   sending an email request for approval by the user, in real-time, of a target item based on the target item exceeding a predefined monetary threshold, wherein the email request includes a link to the target item identified based on the conditions of the user specification, which must be clicked by the user as an indication of approval; and
   initiating the electronic payment function by an electronic device based on determining that conditions of the user specification are met, and the real-time user approval of the target item using the link included in the email request, is received, whereby the initiated electronic payment function triggers an electronic purchase of the target item.

2. The method of claim 1, wherein initiating the electronic payment function comprises:
   receiving a connected payment method; and
   initiating the electronic payment function using the connected payment method.

3. The method of claim 1, wherein facilitating the agreement between the user and the merchant further comprises:
   determining that a price condition of the target item is within a defined percentage of the merchant's listed price for the target item, or that the merchant's listed price for the target item will remain above the price condition of the target item for a determined number of months; and
   coordinating, via email, with the merchant and the user.

4. The method of claim 1, further comprising:
   a determination that a similar item may be suitable to the user based on at least one of the conditions of the user specification being met; and
   a programming instruction to initiate the electronic payment function automatically and to complete the electronic payment function with a preferred merchant.

5. The method of claim 3, further comprising:
   prioritizing one or more SKU features based on a desire of the user, wherein the desire of the user is learned based on the user's rejection of a proposed target item by failing to click the link in the email request; and
   updating a prioritization schedule based on the desire of the user, wherein initiating the electronic payment function is performed in accordance with the updated prioritization schedule.

6. The method of claim 1, further comprising:
   notifying a user via email of a successful purchase.

7. The method of claim 1, further comprising:
   determining that a user price is within a predefined threshold of a merchant price, based on a percentage indicated by the user;
   providing the user price to the merchant by sending an automatic message to the merchant to inquire as to whether the target item can be purchased for the user price; and
   facilitating a purchase based on a response of the merchant, at the user price.

8. A computer system for managing an electronic payment function by an electronic device, comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   determining, using one or more connected databases comprising one or more items for purchase, that conditions of a user specification are met, wherein the conditions of the user specification are determined based on capturing a photograph of a stock keeping unit (SKU) data structure at a user direction, using a camera input capability of a mobile device or tablet by scanning the SKU data structure using a wireless communication capability of the mobile device or tablet, wherein the SKU data structure has associated conditions of the user specification, and performing visual analysis of the one or more items for purchase;
   facilitating an agreement between a user and a merchant;
   sending an email request for approval by the user, in real-time, of a target item based on the target item exceeding a predefined monetary threshold, wherein the email request includes a link to the target item identified based on the conditions of the user specification, which must be clicked by the user as an indication of approval; and
   initiating the electronic payment function by an electronic device based on determining that conditions of the user specification are met, and the real-time user approval of the target item using the link included in the email request, is received, whereby the initiated electronic payment function triggers an electronic purchase of the target item.

9. The computer system of claim 8, wherein initiating the electronic payment function comprises:
   receiving a connected payment method; and
   initiating the electronic payment function using the connected payment method.

10. The computer system of claim 8, wherein facilitating the agreement between the user and the merchant further comprises:
    determining that a price condition of the target item is within a defined percentage of the merchant's listed price for the target item; and
    coordinating, via email, with the merchant and the user.

11. The computer system of claim 8, further comprising:
    a determination that a similar item may be suitable to the user based on at least one of the conditions of the user specification being met; and
    a programming instruction to initiate the electronic payment function automatically and to complete the electronic payment function with a preferred merchant.

12. The computer system of claim 10, further comprising:
prioritizing one or more SKU features based on a desire of the user, wherein the desire of the user is learned based on the user's rejection of a proposed target item by failing to click the link in the email request; and
updating a prioritization schedule based on the desire of the user, wherein initiating the electronic payment function is performed in accordance with the updated prioritization schedule.

13. The computer system of claim 8, further comprising:
notifying a user via email of a successful purchase.

14. The computer system of claim 8, further comprising:
determining that a user price is within a predefined threshold of a merchant price, based on a percentage indicated by the user;
providing the user price to the merchant by sending an automatic message to the merchant to inquire as to whether the target item can be purchased for the user price; and
facilitating a purchase based on a response of the merchant, at the user price.

15. A computer program product for managing an electronic payment function by an electronic device, comprising:
one or more non-transitory computer-readable storage media and program instructions stored on at least one of the one or more tangible storage media, the program instructions executable by a processor to cause the processor to perform a method comprising:
determining, using one or more connected databases comprising one or more items for purchase, that conditions of a user specification are met, wherein the conditions of the user specification are determined based on capturing a photograph of a stock keeping unit (SKU) data structure at a user direction, using a camera input capability of a mobile device or tablet by scanning the SKU data structure using a wireless communication capability of the mobile device or tablet, wherein the SKU data structure has associated conditions of the user specification, and performing visual analysis of the one or more items for purchase;
facilitating an agreement between a user and a merchant;
sending an email request for approval by the user, in real-time, of a target item based on the target item exceeding a predefined monetary threshold, wherein the email request includes a link to the target item identified based on the conditions of the user specification, which must be clicked by the user as an indication of approval; and
initiating the electronic payment function by an electronic device based on determining that conditions of the user specification are met, and the real-time user approval of the target item using the link included in the email request, is received, whereby the initiated electronic payment function triggers an electronic purchase of the target item.

16. The computer program product of claim 15, wherein initiating the electronic payment function comprises:
receiving a connected payment method; and
initiating the electronic payment function using the connected payment method.

17. The computer program product of claim 15, wherein facilitating the agreement between the user and the merchant further comprises:
determining that a price condition of the target item is within a defined percentage of the merchant's listed price for the target item; and
coordinating, via email, with the merchant and the user.

18. The computer program product of claim 15, further comprising:
a determination that a similar item may be suitable to the user based on at least one of the conditions of the user specification being met; and
a programming instruction to initiate the electronic payment function automatically and to complete the electronic payment function with a preferred merchant.

19. The computer program product of claim 17, further comprising:
prioritizing one or more SKU features based on a desire of the user, wherein the desire of the user is learned based on the user's rejection of a proposed target item by failing to click the link in the email request; and
updating a prioritization schedule based on the desire of the user, wherein initiating the electronic payment function is performed in accordance with the updated prioritization schedule.

20. The computer program product of claim 15, further comprising:
determining that a user price is within a predefined threshold of a merchant price, based on a percentage indicated by the user;
providing the user price to the merchant by sending an automatic message to the merchant to inquire as to whether the target item can be purchased for the user price; and
facilitating a purchase based on a response of the merchant, at the user price.

* * * * *